United States Patent
Mackiewich et al.

(10) Patent No.: US 7,170,897 B2
(45) Date of Patent: Jan. 30, 2007

(54) METHOD AND APPARATUS FOR IMPLEMENTING POINT-TO-MULTIPOINT COMMUNICATIONS OVER A CONNECTION- BASED DATA COMMUNICATION NETWORK

(75) Inventors: Blair T. Mackiewich, Surrey (CA); Thomas Tadsen, Burnaby (CA); Yuming Wen, Delta (CA); Radu C. Ungureanu, Coquitlam (CA)

(73) Assignee: Alcatel Canada Inc. (CA)

( * ) Notice: Subject to any disclaimer, the term of this patent is extended or adjusted under 35 U.S.C. 154(b) by 1050 days.

(21) Appl. No.: 10/004,313

(22) Filed: Dec. 6, 2001

(65) Prior Publication Data
US 2003/0108047 A1 Jun. 12, 2003

(51) Int. Cl.
*H04L 12/28* (2006.01)
(52) U.S. Cl. .............. 370/401; 370/395.53; 370/395.1; 370/230
(58) Field of Classification Search ................ 370/389, 370/392, 397, 399, 395.33, 401, 395.1, 230, 370/351
See application file for complete search history.

(56) References Cited

U.S. PATENT DOCUMENTS

| | | | | | |
|---|---|---|---|---|---|
| 5,444,702 | A | * | 8/1995 | Burnett et al. | 370/254 |
| 5,812,552 | A | * | 9/1998 | Arora et al. | 370/395.53 |
| 6,005,864 | A | * | 12/1999 | Krause | 370/395.53 |
| 6,016,319 | A | * | 1/2000 | Kshirsagar et al. | 370/410 |
| 6,041,063 | A | * | 3/2000 | Povlsen et al. | 370/395.53 |
| 6,816,489 | B1 | * | 11/2004 | Patra et al. | 370/390 |
| 2004/0017812 | A1 | * | 1/2004 | Kamo | 370/395.1 |

* cited by examiner

*Primary Examiner*—Ricky Q. Ngo
*Assistant Examiner*—Nguyen Ngo
(74) *Attorney, Agent, or Firm*—Oyen Wiggs Green & Mutala LLP

(57) ABSTRACT

A bridged virtual LAN (VLAN) has a number of segments connected by a connection-based network such as an ATM network. Multicast data originating in a first one of the segments is carried to two or more other segments by a point-to-multipoint virtual channel configured in the connection-based network. A separate point-to-point virtual channel may be provided for other data and bidirectional control signals. The segments may be ethernet segments with data flow over the point-to-multipoint virtual channel being unidirectional. Ethernet frames may be carried by a protocol such as AAL5.

32 Claims, 4 Drawing Sheets

METHOD AND APPARATUS FOR IMPLEMENTING POINT-TO-MULTIPOINT COMMUNICATIONS OVER A CONNECTION-BASED DATA COMMUNICATION NETWORK

TECHNICAL FIELD

The invention relates to data communication networks. The invention relates specifically to the provision of point-to-multipoint communications in computer networks in which a number of network segments are linked by a connection-based network. The connection-based network may comprise a cell relay network such as asynchronous transfer mode (ATM) networks.

BACKGROUND

Computer networks carry data between various devices. The data may be carried in connection-based links, such as the virtual circuits in an Asynchronous Transfer Mode (ATM) network. Data may also be carried between devices in network segments wherein data is broadcast to all of a plurality of devices on the segment on a broadcast-type medium. An example of the latter is an ethernet network. It is typically convenient to set up local area networks (LANs) using a broadcast type medium over which devices can share data.

In some circumstances, for example, where a LAN is required to connect devices which are geographically distant from one another, the LAN may be broken into separate segments. Within each segment devices can exchange data by way of a broadcast-type medium. The segments may be connected to one another by way of connection-based links. Such a LAN may be called a virtual LAN (VLAN). There are various existing standards which apply to VLANs of specific types.

LANE, described in ATM Forum Specification af-lane-0021.00, describes a method for LAN emulation over ATM. LANE specifies a client-server architecture in which clients only forward frames with known destinations. All other traffic is forwarded to a server which determines destinations to which the frames should be forwarded.

Various standards exist for transporting variable-sized data packets, such as ethernet frames over ATM connections. For example, IETF RFC 2684 provides protocols for encapsulating various packet types (ethernet, IP, etc.) for transport over AAL5.

Various standards for routing variable-sized data packets over connection-based networks also exist. These include classical IP and ARP over ATM (IETF RFC 2225), multiprotocol over ATM ("MPOA") as specified in IETF RFC 2684 or multiprotocol label switching ("MPLS") as specified in IETF RFCs 2917 and 3035.

FIG. 1 shows an example of a simple VLAN 10. VLAN 10 comprises three segments 12 (individually labeled 12A, 12B, and 12C). Each segment 12 comprises a number of devices 13 connected by an ethernet. Segments 12 are connected by virtual circuits through an ATM network 14. Bridges 16A, 16B and 16C (collectively bridges 16) interface segments 12 to ATM network 14. Network 14 is typically set up to provide a point-to-point (P2P) virtual circuit between each bridge 16 and other bridges 16 which belong to VLAN 10.

The topology of a VLAN may be established using a protocol such as the spanning tree protocol (STP). STP generates a network topology which is defined by a spanning tree. The spanning tree defines a topology which does not include any closed loops.

There are various situations in which it is desirable to direct communications which originate at one point in a VLAN 10 to multiple destinations in multiple network segments. For example, it may be desirable to simultaneously deliver streaming video data from one device 13 to a number of other devices 13 on the network.

There are ATM standards which permit the configuration of point-to-multipoint (P2MP) ATM channels. It has not been practical to use such channels for multicasting data which originates in a segment of a VLAN.

U.S. Pat. No. 6,111,880 discloses a switch which supports both ATM and ethernet operation. The switch uses a special internal data format. The switch enables multicast data traffic by setting a "multicast mask" tag in a VPI/VCI lookup table in memory.

U.S. Pat. No. 5,852,606 discloses a method and apparatus for transmitting cells across and ATM switch bus. A routing tag provides multicast group destination information.

There exists a need for cost effective methods and apparatus for carrying multicast data transmissions which originate at a segment of a bridged LAN.

SUMMARY OF THE INVENTION

This invention provides methods and apparatus for delivering multicast data traffic to a plurality of destinations. One aspect of the invention provides a method for delivering multicast data traffic originating in a broadcast-based computer network to a plurality of destinations on a connection-based network. The method comprises providing a bridge connecting the broadcast-based network and the connection-based network. The bridge provides one or more ports at which virtual channels in the connection-based network can terminate. The method also includes setting up a point-to-multipoint virtual channel in the connection-based network. The point-to-multipoint virtual channel has a root at a first one of the ports and a plurality of leaves at destination nodes in the connection-based network. The first one of the ports is associated with one or more multicast addresses in a filtering database associated with the bridge. The method involves, at the bridge, forwarding multicast data frames addressed to the multicast address and originating in the broadcast-based computer network to the first one of the ports. The connection-based network may comprise an ATM network. In some embodiments the connection-based network is internal to a bridging device and may comprise a switching fabric within the bridging device. In other embodiments the connection-based network is a geographically extended network.

Another aspect of the invention provides a method for carrying multicast data traffic originating at a source segment of a virtual network to a plurality of destination segments of the virtual network. The the source and plurality of destination segments each connect to a connection-based network at a bridge. The method comprises: at a first bridge connected to the source segment, associating at least one multicast address with a first remote interface port and configuring the remote interface port as an ingress-only port; provisioning in the connection-based network a point-to-multipoint virtual channel having a root endpoint at the remote interface port and a plurality of leaf nodes; directing multicast data addressed to the at least one multicast address to the first remote interface bridge port; and, passing the multicast data to the destination segments by way of the point-to-multipoint virtual channel.

Yet another aspect of the invention provides a bridge device comprising: a network interface configured to receive variable sized data frames from a first network; a plurality of bridge ports; a switching fabric configurable to provide data connections between the bridge ports and a plurality of external data connections, the external data connections each associated with one of one or more output interfaces; a point-to-multipoint virtual channel configured in the switching fabric, the point-to-multipoint virtual channel having a root at a first one of the bridge ports and a plurality of leaves, the leaves each connected to one of the external data connections; and, a filtering database associated with the bridge, the filtering database containing a first entry associating one or more multicast addresses with the first one of the bridge ports.

A further aspect of the invention provides a virtual local area network comprising: a plurality of segments interconnected by a connection-based network; a bridge associated with each of the segments each bridge connecting a corresponding one of the segments to the connection-based network; a first bridge associated with a first one of the segments, the first bridge comprising a plurality of bridge ports each capable of being connected to a virtual channel in the connection-based network; a point-to-multipoint virtual channel in the connection-based network, the point-to-multipoint virtual channel having a root node associated with a first one of the bridge ports and a plurality of leaf nodes, each of the leaf nodes connected to one of the bridges corresponding to another one of the segments; and a point-to-point virtual channel in the connection-based network, the point-to-point virtual channel connecting a second one of the bridge ports to one of the bridges corresponding to another one of the segments.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
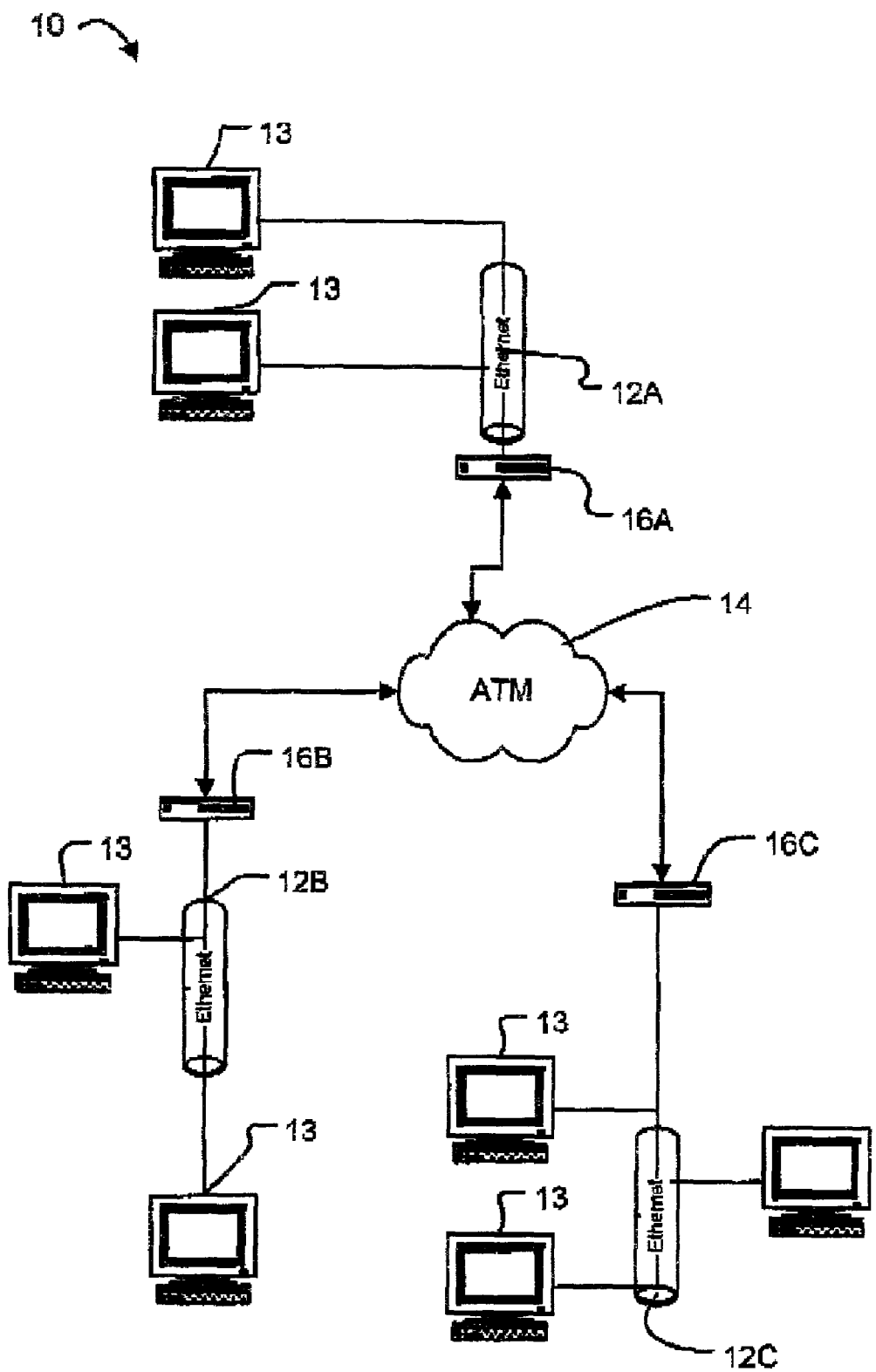
FIG. 1 is a schematic diagram of a network having a number of ethernet segments connected by cell relay channels.
Figure 2:
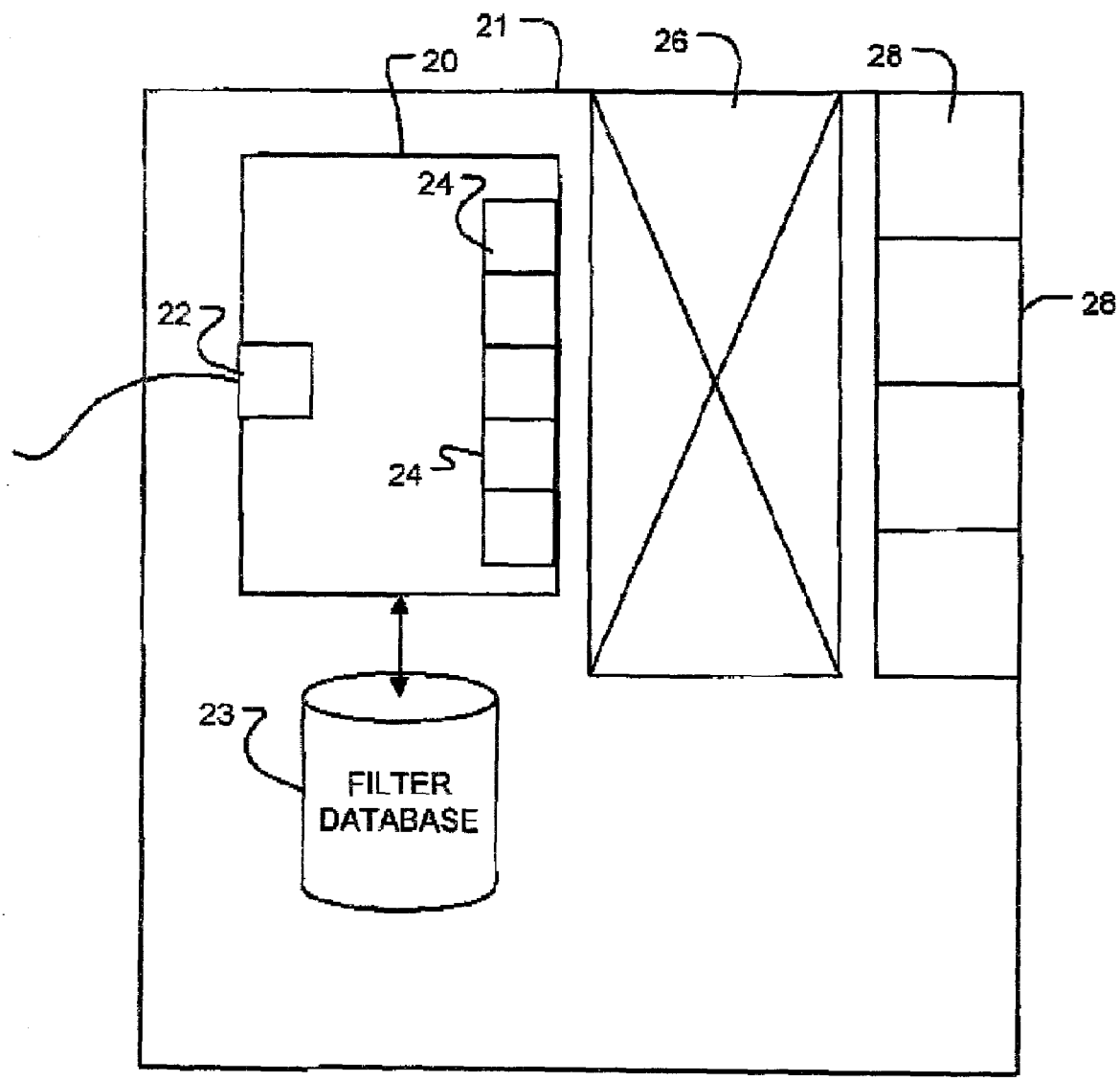
FIG. 2 is a block diagram of a bridge according to an embodiment of the invention.

This invention provides a bridge 20 as shown in FIG. 2. Bridge 20 comprises a local interface port 22, and a plurality of remote interface port 24. From the point of view of bridge 20, local interface port 22 and remote interface ports 24 may be equivalent. Each remote interface port 24 can serve as a termination endpoint for one or more virtual channels in a connection-based network. Remote interface ports 24 could, but do not need to, comprise separate physical devices. Remote interface ports 24 may comprise virtual remote interface ports 24.

In the illustrated embodiment, bridge 20 is part of a device 21 which includes a switching fabric 26 and one or more output interfaces 28. Switching fabric 26 selectively establishes virtual channels (or "connections") between ports 24 and the output interfaces 28.

Bridge 20 has access to a filtering database 23. Bridge 20 looks up in filtering database 23 the destinations of frames received at local interface port 22. If database 23 indicates that the destination for a frame is on segment 11 then bridge 20 may drop the frame. If filtering database 23 indicates that the destination for the frame is associated with a specific port 24 then bridge 20 forwards the frame to the specific port 24. If filtering database 23 has no record of the destination for the frame then bridge 20 may forward the frame to multiple ports 24.

In the illustrated embodiment, network interface 22 connects to a broadcast type medium, such as an ethernet network. Data is transferred in the broadcast-type medium in variable-size frames. In the illustrated embodiment, switching fabric 26 is an ATM switching fabric and data is transferred out of ports 24 and is received at ports 24 in fixed-size cells. The frames of network segment 11 may be transported in fixed-size cells using any suitable protocol. ATM adaptation layer 5 (AAL5) specifies one protocol for encapsulating variable length data frames for delivery over an ATM cell relay network.

Figure 3:
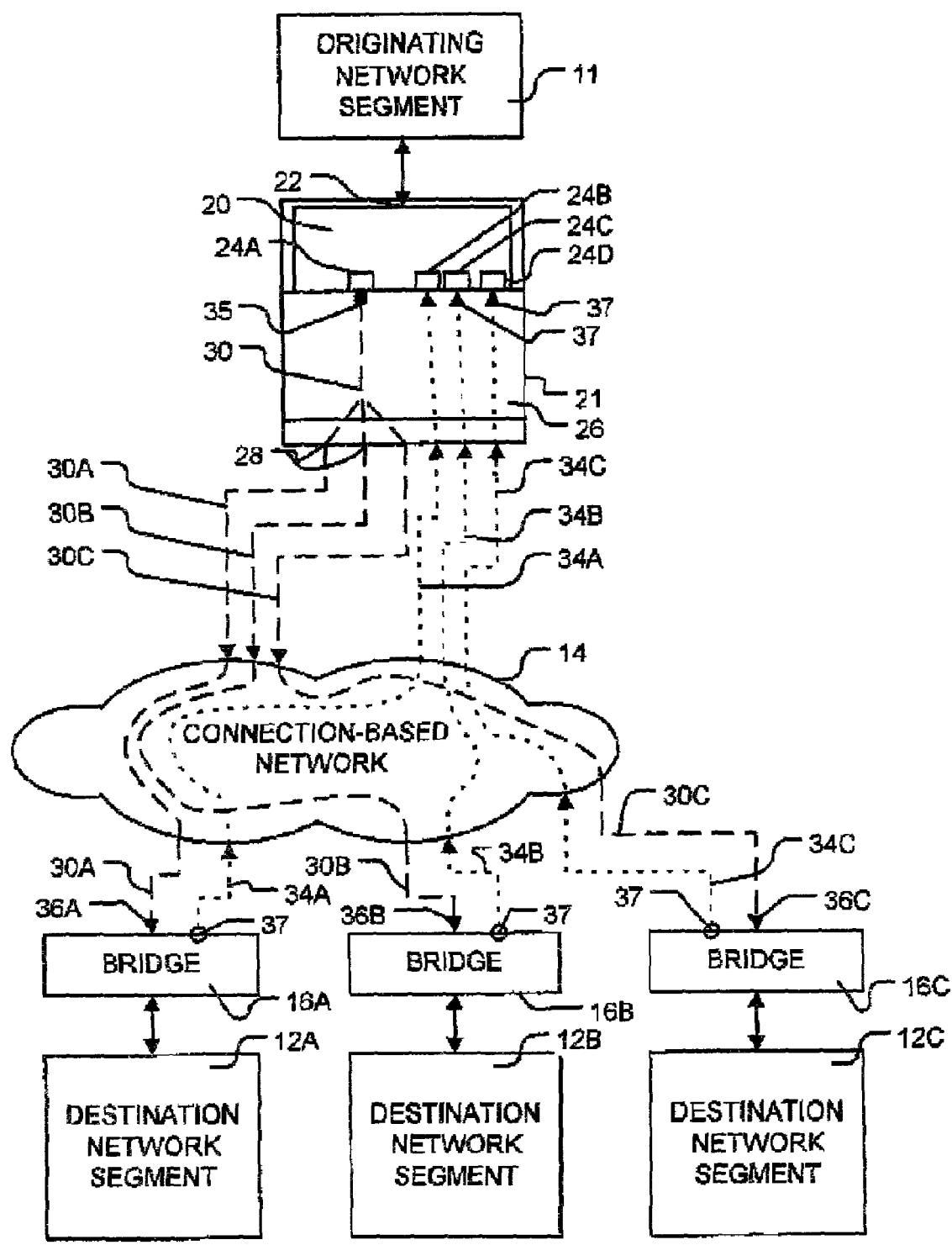
FIG. 3 is a schematic diagram illustrating a virtual LAN in which multicast data is transmitted to several destinations; and, FIG. 4 is a schematic diagram illustrating a virtual LAN having a configuration different from that of FIG. 3 in which multicast data is transmitted to several destinations.

As shown in FIG. 3, device 21 can be connected between a network which operates in a broadcast-type medium and a connection-based network 14. Device 21 can be used to establish point-to-multipoint communications between a device connected to local interface port 22 and a plurality of endpoints in the connection-based network 14. In FIG. 3 the data to be delivered by way of the point-to-multipoint virtual channel originates in a segment 11 of a VLAN which is connected to local interface port 22 and the endpoints are shown as being in segments 12A, 12B, and 12C of the VLAN. Segments 12A, 12B and 12C of the VLAN are each connected to connection-based network 14 by way of a bridge 16. Bridges 16 could comprise devices 21 or other bridges.

Bridge 20 directs data to be multicast to a port 24A. Port 24A is configured to be at a root endpoint 35 of an ATM P2MP virtual channel 30 which has leaf endpoints (36A, 36B and 36C) at each of bridges 16. Port 24A may be termed a "first remote interface port". In the illustrated embodiment, P2MP virtual channel 30 is provisioned within switching fabric 26 and has leaf endpoints at three different interfaces 28. Virtual channels 30A, 30B and 30C connect interfaces 28 to bridges 16A, 16B, and 16C respectively. Virtual channels 30A, 30B and 30C may be considered to be part of P2MP virtual channel 30 even though they may be provisioned separately. The endpoints of virtual channels 30A, 30B and 30C at bridges 16 may be considered to be leaf endpoints of P2MP virtual channel 30. Virtual channel 30 may be provisioned in any suitable way, either administratively or via ATM signaling.

The embodiment of FIG. 3 can reduce bandwidth required at bridge 20 since it is not necessary for bridge 20 to replicate all multicast frames.

In some cases there is a need for signals to be transmitted from the destination of a multicast to the source. As shown in FIG. 3, a plurality of point-to-point virtual channels 34 may be provided for this purpose. Virtual channels 34A, 34B and 34C extend respectively between ports 24B, 24C and 24D at bridge 20 and bridges 16A, 16B, and 16C. Virtual channels 34A, 34B and 34C may carry bidirectional return control messaging. Virtual channels 34A, 34B and 34C terminate at each end at a bi-directional endpoint 37. Ports 24B, 24C and 24D may be termed "second remote interface ports".

Filtering database 23 includes an entry which identifies port 24A as the port to which bridge 20 should forward all frames carrying specified multicast addresses which indicate that the frames should be delivered by way of virtual channel 30. When such frames are received at local interface port 22, bridge 20 forwards them to port 24A and, from there, carried by P2MP virtual channel 30 to each of bridges 16. Unicast frames can be carried to their destinations by way of one of virtual channels 34.

Multicast frames which have multicast addresses which do not correspond to the specified multicast addresses can also be delivered by way of virtual channels 34. This permits differentiated service to be provided to different classes of multicast traffic. For example, virtual channel 30 may comprise a high bandwidth, low jitter connection. Specified multicast traffic, such as a video broadcast, audio broadcast, multimedia transmission, or the like could be carried on virtual channel 30. Other traffic, which could include other multicast traffic, may be carried on virtual channels 34. In general the Quality of Service (QoS) provided by channels 30 and 34 may be different.

Normally when a bridge receives a frame addressed to a multicast address it forwards the frame to multiple bridge ports. In preferred embodiments of this invention, filtering database 23 includes entries which associate specific multicast addresses with specific remote interface pots 24. For example, filtering database 23 may include entries which associate one or more multicast addresses with port 24. Where such an entry exists for a multicast address then bridge 20 directs frames addressed to the multicast address only to the specified port. These entries may be configured manually or automatically using a suitable protocol such as GMRP (GARP Multicast Registration Protocol).

It is also desirable, and in some cases essential, to eliminate loops along which data can propagate. One way to do this is to designate virtual channel 30 as a unidirectional virtual channel. The port 24A at the root 35 of P2MP virtual channel 30 may be designated "ingress only". In this context, "ingress" means a direction of data flow from bridge 20 into virtual channel 30 for delivery to the leaf endpoints 36 of P2MP virtual channel 30. Port 24A drops any data which is egressing from virtual channel 30. In this context, "egress" refers to a direction of data flow in which data arrives at bridge 20 from virtual channel 30. Ports in bridges 16 at the leaf endpoints 36 of P2MP virtual channel 30 may be designated "egress only". Those ports only pass data arriving at bridges 16 through virtual channel 30 and block data originating at bridges 16 from being sent out on virtual channel 30. Bridges 16 may drop all data which would otherwise be sent out such ports.

Another way to avoid loops is to either not provide or to disable virtual circuit-to-virtual circuit (VC-to-VC) forwarding at port 24A as well as at the leaf endpoints of virtual channel 30.

Where virtual channel 30 is part of a network which is configured by a spanning tree protocol (STP) then steps may be taken to prevent the spanning tree protocol from detecting multiple paths between bridge 20 and one or more of bridges 16. STP attempts to eliminate multiple paths. One way to avoid such problem in cases where STP is being used is to effectively disable STP for virtual channel 30. This may be done by configuring STP to ignore any ports which are configured as "egress only" or "ingress only".

Figure 4:
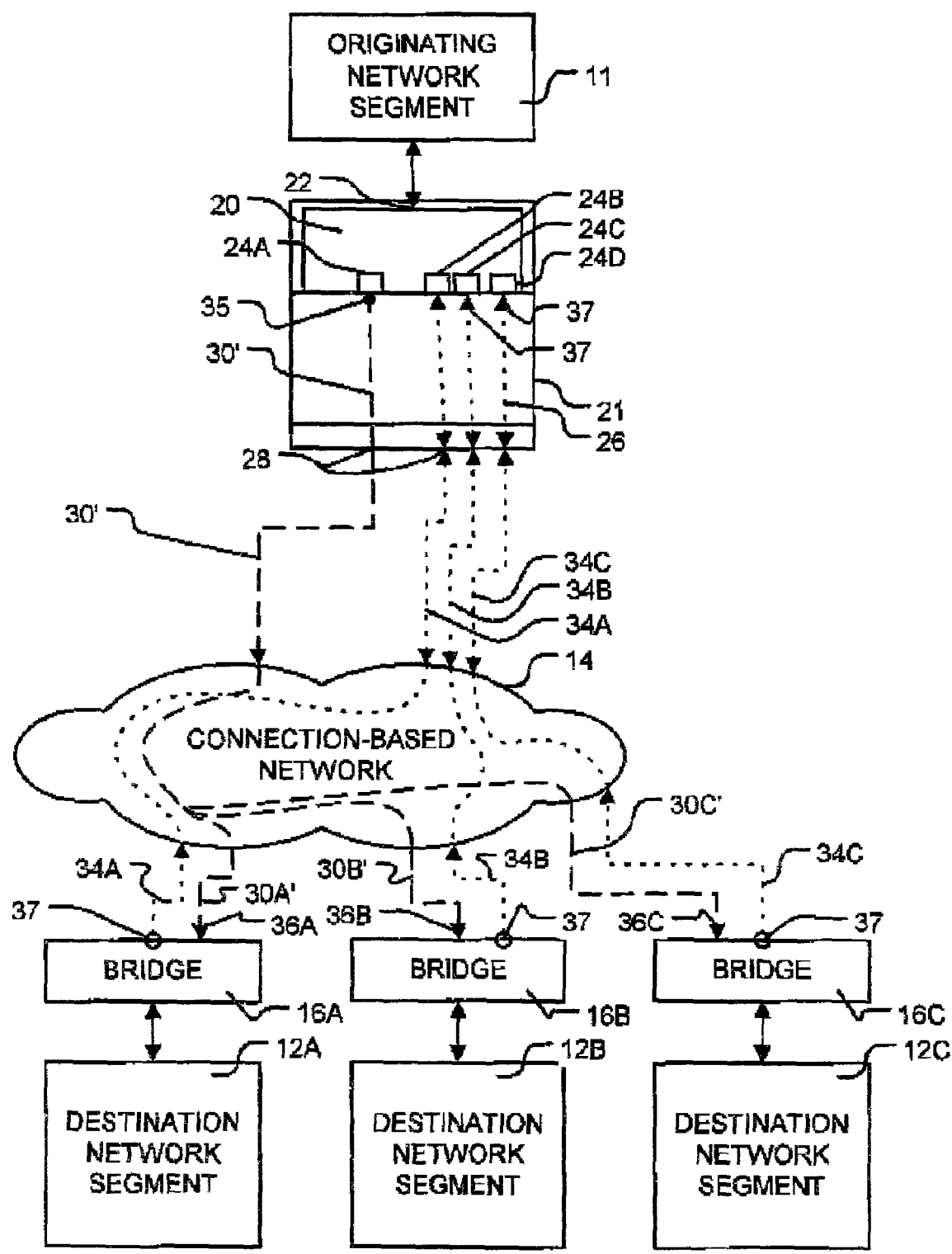

FIG. 4 illustrates an alternative embodiment of the invention wherein a P2MP virtual channel 30' splits into multiple branches 30A', 30B' and 30C' at a node in connection-oriented network 14 which is separate from device 21. This conserves bandwidth in portions of network 14.

Some specific embodiments of the invention provide a bridge connected to a source of multicast traffic. A P2MP virtual circuit root endpoint is configured on a first ATM bridge port of the bridge. The first port is configured as an ingress only port. A filtering database entry associates at least one multicast address with the first port. The source bridge may have other ports configured as normal ports.

Bridges at destination (leaf endpoints) of the P2MP virtual channel have ports connected to the leaf endpoints. These ports are configured as "egress-only" ports. Bridges 16 are configured to not learn source addresses from data received by way of an egress-only port. The destination bridges may have other ports configured as normal ports. When P2MP virtual channel 30 is set up, the port at which the root of virtual channel 30 is located may be configured automatically to be ingress-only ports. The ports at the leaf endpoints of virtual connection 30 may be configured automatically to be egress-only ports.

Those skilled in the art will appreciate that the foregoing embodiments of the invention provide a mechanism for delivering multicast data traffic over P2MP virtual channels. The virtual channels may be ATM virtual circuits. Bidirectional connectivity is provided by additional point-to-point virtual channels. No ATM VC-merge function is required anywhere in the multicast path.

Certain implementations of the invention comprise computer processors which execute software instructions which cause the processors to perform a method of the invention. The invention may also be provided in the form of a program product. The program product may comprise any medium which carries a set of computer-readable signals comprising instructions which, when executed by a computer processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The invention could be embodied in a LANE-type virtual network having unidirectional connections to LAN Emulation Servers (LES) and LAN Emulation Clients (LECs). In such embodiments the servers may specify separate paths for multicast source to destination communication and destination to source communication as described above;

Output interfaces 28 could comprise mechanisms for adapting a cell stream received on P2MP virtual channel 30 into one or more other data formats such as ethernet frames, frame relay frames, packet over SONET frames etc. In such embodiments, P2MP virtual channel 30 may exist completely within a bridging device 21.

A single bridge 20 may have a plurality of remote interface ports connected to root endpoints of a plurality of P2MP virtual channels 30. Each of the ports connected to one of the plurality of P2MP virtual channels 30 may be associated with one or more multicast addresses by way of static entries in a filtering database 23.

Accordingly, the scope of the invention is to be construed in accordance with the substance defined by the following claims.

What is claimed is:

1. A method for delivering multicast data traffic originating in a broadcast-based computer network to a plurality of destinations on a connection-based network, the method comprising:
   (a) providing a device connecting the broadcast-based network and the connection-based network, the device comprising a bridge for providing a unidirectional connection between a local interface port associated with said broadcast-based network and a remote interface port associated with said connection-based network;
   b) at said device, associating said remote interface port with a multicast address;
   c) setting up a point-to-multipoint virtual channel over the connection-based network, the point-to-multipoint virtual channel having a root at said remote interface port and a plurality of leaves at destination nodes in the connection-based network; and,
   d) forwarding multicast data frames addressed to the multicast address and originating in the broadcast-based computer network from said remote interface port to said destination nodes.

2. The method of claim 1 wherein the broadcast-based network comprises an ethernet network and the data frames comprise ethernet data frames.

3. The method of claim 1 wherein the connection-based network comprises an asynchronous transfer mode network and the point-to-multipoint virtual channel comprises a multipoint ATM virtual circuit having a root associated with said remote interface port.

4. The method of claim 3 wherein the broadcast-based network comprises an ethernet network and the data frames comprise ethernet data frames.

5. The method of claim 1 wherein step c) comprises:
   c1) establishing said point-to-multipoint virtual channel within said device between said remote interface port and a plurality of output interfaces based on said multicast address; and c2) establishing, across said connection-based network, a virtual connection between each said output interface and a respective destination node of said destination nodes.

6. The method of claim 5 comprising providing in the connection-based network a unicast point-to-point virtual channel for establishing a bidirectional connection between one of the destination nodes and a further output interface of said device.

7. The method of claim 6 comprising, performing bidirectional return control messaging between said one of the destination nodes and said further output interface.

8. The method of claim 6 comprising providing in the connection-based network a point-to-point virtual channel connecting each of the destination nodes to a respective additional output interface.

9. The method of claim 6 comprising configuring the point-to-multipoint and point-to-point virtual channels to provide specific levels of quality of service.

10. The method of claim 1 wherein the association of the multicast address and said remote interface port is a static association.

11. The method of claim 1 wherein the broadcast-based computer network constitutes a segment of a virtual local area network having a plurality of segments and the destination nodes comprise bridges connecting the connection-based network to other segments of the virtual local area network.

12. The method of claim 11 wherein the broadcast-based network comprises an ethernet network and the data frames comprise ethernet data frames.

13. The method of claim 12 comprising forwarding video data to the plurality of destinations by way of the point-to-multipoint virtual channel.

14. The method of claim 13 comprising forwarding control signals associated with the video data over the point-to-point virtual channel to a source of the video data on the broadcast-based network.

15. The method of claim 12 comprising forwarding audio data to the plurality of destinations by way of the point-to-multipoint virtual channel.

16. The method of claim 11 comprising configuring the virtual local area network by applying a spanning tree protocol and, in applying the spanning tree protocol, ignoring the point-to-multipoint virtual channel.

17. The method of claim 1 comprising transmitting data in the broadcast-based network in frames and transmitting data in the connection-based network in fixed-size cells wherein the frames are not equal in size to the cells.

18. The method of claim 17 wherein the frames are variable-size frames.

19. The method of claim 18 wherein the connection-based network comprises an asynchronous transfer mode network and the point-to-multipoint virtual channel comprises a multipoint ATM virtual circuit having a root associated with said remote interface port, wherein said frames are carried in cells according to the AAL5 protocol.

20. A method for delivering multicast data traffic originating in a broadcast-based computer network to a plurality of destinations on a connection-based network, the method comprising:
   providing a bridge connecting the broadcast-based network and the connection-based network, the bridge providing one or more ports at which virtual channels in the connection-based network can terminate;
   setting up a point-to-multipoint virtual channel in the connection-based network, the point-to-multipoint virtual channel having a root at a first one of the ports and a plurality of leaves at destination nodes in the connection-based network;

in a filtering database associated with the bridge, associating the first one of the ports with one or more multicast addresses;

at the bridge forwarding multicast data frames addressed to the multicast address and originating in the broadcast-based computer network to the first one of the ports;

providing in the connection-based network a point-to-point virtual channel connecting at least a first one of the destination nodes to a second one of the ports;

providing in the connection-based network a point-to-point virtual channel connecting each of the destination nodes to a different one of the ports; and, configuring the first one of the ports as a unidirectional port and subsequently discarding any data received at the bridge by way of the first one of the ports.

21. A method for delivering multicast data traffic originating in a broadcast-based computer network to a plurality of destinations on a connection-based network, the method comprising:

providing a bridge connecting the broadcast-based network and the connection-based network, the bridge providing one or more ports at which virtual channels in the connection-based network can terminate;

setting up a point-to-multipoint virtual channel in the connection-based network, the point-to-multipoint virtual channel having a root at a first one of the ports and a plurality of leaves at destination nodes in the connection-based network;

in a filtering database associated with the bridge, associating the first one of the ports with one or more multicast addresses;

at the bridge forwarding multicast data frames addressed to the multicast address and originating in the broadcast-based computer network to the first one of the ports;

wherein the broadcast-based computer network constitutes a segment of a virtual local area network having a plurality of segments and the destination nodes comprise bridges connecting the connection-based network to other segments of the virtual local area network;

providing in the connection-based network a point-to-point virtual channel connecting at least a first one of the destination nodes to a second one of the ports;

providing in the connection-based network a point-to-point virtual channel connecting each of the destination nodes to a different one of the ports; and, configuring the first one of the ports as a unidirectional port and subsequently discarding any data received at the bridge by way of the first one of the ports.

22. A method for carrying multicast data traffic originating at a source segment of a virtual network to a plurality of destination segments of the virtual network, the source and plurality of destination segments each connected to a connection-based network by a respective bridge, the method comprising:

at a first bridge connected to the source segment, providing a unidirectional connection between a local interface port associated with said source segment of the virtual network and a first remote interface port associated with said connection-based network, and associating a multicast address with said first remote interface port;

provisioning in the connection-based network a point-to-multipoint virtual channel having a root endpoint at the first remote interface port and a plurality of leaf endpoints at a plurality of destination nodes;

directing multicast data having said multicast address from said source segment of the virtual network to the first remote interface port; and, passing the multicast data to the destination segments by way of the point-to-multipoint virtual channel.

23. The method of claim 22 wherein the leaf endpoints are each at a port on one of the bridges associated with one of the destination segments.

24. The method of claim 23 comprising providing a bidirectional point-to-point virtual channel in the connection-based network having an endpoint at a second remote interface port of the first bridge and another endpoint on one of the bridges associated with one of the destination segments.

25. A bridge device connected between a first network and a second network comprising:

a bridge for transmitting variable sized data frames received from said first network at a local interface port to a first remote interface port, said bridge comprising a unidirectional connection between the local interface port and the first remote interface port;

a switching fabric for switching said variable sized data frames from said first remote interface port to a plurality of output interfaces, each of said output interfaces connected to said second network; and, a filtering database comprising a first entry for mapping an address of said local interface port with an address of said first remote interface port for enabling configuration of a point-to-multipoint virtual channel with a root at said bridge and a plurality of leaves each connected to one of said output interfaces.

26. The bridge device of claim 25 wherein the switching fabric comprises an ATM switching fabric and the point-to-multipoint virtual channel comprises a multipoint ATM virtual circuit.

27. The bridge device of claim 26 wherein said filtering database further comprises a second entry for mapping the address of said local interface port with an address of a second remote interface port of said bridge for providing a point-to-point virtual channel for enabling exchange of bidirectional control information with a remote node.

28. The bridge device of claim 25 wherein the first entry is a static entry and the bridge is configured to forward to said first remote interface port only those frames which have a multicast address which matches the static entry.

29. A virtual local area network comprising:

a plurality of segments interconnected by a connection-based network;

a bridge associated with each of the segments, each bridge connecting a corresponding one of the segments to the connection-based network, wherein a first bridge associated with a first one of the segments comprises a local interface port connected to the first segment and a plurality of remote interface ports, each remote interface port capable of being connected to a virtual channel in the connection-based network, said first bridge providing a unidirectional connection between said local interface port and a first remote interface port;

a point-to-multipoint virtual channel in the connection-based network, the point-to-multipoint virtual channel having a root node associated with said first remote interface port and a plurality of leaf nodes, each of the leaf nodes connected to one of the bridges corresponding to another one of the segments;

a point-to-point virtual channel in the connection-based network, the point-to-point virtual channel connecting a second remote interface port to one of the bridges corresponding to another one of the segments.

30. The local area network of claim 29 wherein the point-to-point virtual channel provides a bidirectional data connection and the point-to-multipoint virtual channel provides a unidirectional data connection.

31. The local area network of claim 29 wherein the first network segment comprises an ethernet network segment.

32. The local area network of claim 31 wherein the connection-based network comprises an asynchronous transfer mode network and the point-to-multipoint virtual channel comprises a point-to-multipoint virtual circuit.

* * * * *